(12) United States Patent
Davidsson et al.

(10) Patent No.: US 10,013,879 B2
(45) Date of Patent: Jul. 3, 2018

(54) METHOD AND SYSTEM FOR ADDRESSING AND IDENTIFYING VEHICLES ADAPTED FOR RECEIPT OF A DELIVERED SERVICE WHILE BEING UNATTENDED

(71) Applicant: VOLVO CAR CORPORATION, Gothenburg (SE)

(72) Inventors: Staffan Davidsson, Frolunda (SE); Johan Maresch, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 0 days.

(21) Appl. No.: 15/117,368

(22) PCT Filed: Feb. 11, 2015

(86) PCT No.: PCT/EP2015/052826
§ 371 (c)(1),
(2) Date: Aug. 8, 2016

(87) PCT Pub. No.: WO2015/124472
PCT Pub. Date: Aug. 27, 2015

(65) Prior Publication Data
US 2017/0018181 A1    Jan. 19, 2017

(30) Foreign Application Priority Data
Feb. 21, 2014  (EP) .................................... 14156157

(51) Int. Cl.
*G08G 1/01*       (2006.01)
*G08G 1/123*      (2006.01)
(Continued)

(52) U.S. Cl.
CPC ......... *G08G 1/123* (2013.01); *G06Q 10/0833* (2013.01); *G06Q 10/0835* (2013.01);
(Continued)

(58) Field of Classification Search
CPC ........ G08G 1/123; G08G 1/142; H04L 67/12; G06Q 10/0833; G06Q 50/28; G06Q 10/0835
(Continued)

(56) References Cited

U.S. PATENT DOCUMENTS

2004/0075539 A1*  4/2004  Savoie ................ B60R 25/1004
                                              340/426.1
2011/0015934 A1   1/2011  Rowe et al.
(Continued)

FOREIGN PATENT DOCUMENTS

WO   WO/2008/030738   3/2008
WO   WO2012/135472    10/2012

OTHER PUBLICATIONS

International Search Report issued in PCT/EP2015/052826 dated Mar. 30, 2015.
(Continued)

*Primary Examiner* — Tanmay Shah
(74) *Attorney, Agent, or Firm* — Gesmer Updegrove LLP (57) ABSTRACT

The present disclosure relates to a method performed by a vehicle identification system (2) for addressing and identifying vehicles adapted for receipt of a delivered service while being unattended. The vehicle identification system determines (301), by means of a determining unit (21), a position (11) of one or more vehicles of a group of vehicles (1) awaiting the delivered service. The vehicle identification system furthermore determines (302), by means of the determining unit, a position (31) of a service provider (3) adapted to carry out the delivered service. Additionally, the vehicle identification system receives (303), by means of a receiving unit (22), an input (5) from the service provider indicating an interest in nearby vehicles, out of the group of vehicles, which are in vicinity of the service provider. Furthermore, the vehicle identification system determines (Continued)

(304), by means of the determining unit, at least a first nearby vehicle (101), out of the group of vehicles, to be in vicinity of the service provider, based on considering a determined position (1011) of the first nearby vehicle in view of the position of the service provider. The vehicle identification system additionally requests (306), by means of a requesting unit (23), at least the first nearby vehicle to announce itself. The disclosure also relates to a vehicle identification system in accordance with the foregoing, an announcing system (8) and a method performed therein for enabling the vehicle identification system to address and identify vehicles adapted for receipt of a delivered service while being unattended. The disclosure furthermore relates to a vehicle (101) comprising at least parts of such an announcing system.

13 Claims, 4 Drawing Sheets

(51) Int. Cl.
*G06Q 10/08* (2012.01)
*G06Q 50/28* (2012.01)
*H04L 29/08* (2006.01)
*G08G 1/14* (2006.01)

(52) U.S. Cl.
CPC ............. *G06Q 50/28* (2013.01); *H04L 67/12* (2013.01); *G08G 1/142* (2013.01)

(58) Field of Classification Search
USPC .......................................................... 340/933
See application file for complete search history.

(56) References Cited

U.S. PATENT DOCUMENTS

2011/0218933 A1 9/2011 Hujnsaker et al.
2012/0253548 A1* 10/2012 Davidson ............... G06Q 10/08
 701/1

OTHER PUBLICATIONS

Extended European Search Report issued in EP Application No. 14156157.1 dated Jul. 11, 2014.

* cited by examiner

METHOD AND SYSTEM FOR ADDRESSING AND IDENTIFYING VEHICLES ADAPTED FOR RECEIPT OF A DELIVERED SERVICE WHILE BEING UNATTENDED

PRIORITY INFORMATION

The present application is a 371 Application No. PCT/EP2015/052826 filed on Feb. 11, 2015 that claims priority to European Application No. 14156157.1 filed on Feb. 21, 2014. Both applications are incorporated herein by reference in their entireties.

TECHNICAL FIELD

The present disclosure relates to a vehicle identification system and a method performed therein for addressing and identifying vehicles adapted for receipt of a delivered service while being unattended.

BACKGROUND

In recent years, an increasing activity of shopping over the Internet has, among other reasons, led to a desire for alternative, refined package delivery points for consumers. Instead of having to pay a visit to a post office, or stay at home in order to receive a package delivery, a recipient of a package may be given the opportunity to have said package delivered to, for instance, a self-service package delivery service such as e.g. a pick-up locker. In order to retrieve the package, the locker may be opened with a pick-up code unique to the recipient.

For even greater convenience, the recipient of a package may nowadays even be able to choose to have said package delivered directly to his or her parked, unattended vehicle. Giving the delivery service temporary access to the vehicle, for instance via diagnostic technology, to deposit a package, the vehicle may act as a "smart locker" for package drop-off. One such known solution enables a subscriber of delivery services to have installed a tracking unit in his or her vehicle to thereby track the subscriber's daily parking routines. The tracking unit may ping the GPS coordinates of the subscriber's vehicle when it has not moved for, for instance, 15 minutes. Based on these data, a "heat map" may be created of the exact locations where the subscriber's vehicle is mostly parked. Based on the daily and weekly routine of the vehicle, it may be predicted ahead when a package may suitably be delivered. The subscriber may track both the package and the location and status of his or her vehicle. If at the last moment the vehicle is moved, it may be suggested that the delivery is aborted and a new delivery planned. On the other hand, once a package has been delivered, a message, such as e.g. an SMS, may be submitted to the subscriber indicating a successful package drop-off.

However, although the known solution discussed in the foregoing enables for a convenient package delivery by means of the recipients vehicle acting as a package drop-off point, the suggested approach implicates a rather complex solution of tracking one or a plurality of vehicles adapted for receipt of a package delivery.

SUMMARY OF THE INVENTION

It is therefore an object of embodiments herein to provide a more efficient approach with regards to addressing and identifying vehicles adapted for receipt of a delivered service.

According to a first aspect of embodiments herein, the object is achieved by a method performed by a vehicle identification system for addressing and identifying vehicles adapted for receipt of a delivered service while being unattended. The vehicle identification system determines, by means of a determining unit, a position of one or more vehicles of a group of vehicles awaiting the delivered service. The vehicle identification system furthermore determines, by means of the determining unit, a position of a service provider adapted to carry out the delivered service. Additionally, the vehicle identification system receives, by means of a receiving unit, an input from the service provider indicating an interest in nearby vehicles, out of the group of vehicles, which are in vicinity of the service provider. Furthermore, the vehicle identification system determines, by means of the determining unit, at least a first nearby vehicle, out of the group of vehicles, to be in vicinity of the service provider, based on considering a determined position of the first nearby vehicle in view of the position of the service provider. The vehicle identification system additionally requests, by means of a requesting unit, at least the first nearby vehicle to announce itself.

Thereby, by considering positions of the service provider and vehicles awaiting a delivery of a product and/or a service, and further by sorting out which vehicles are considered to be in vicinity of the service provider and requesting these nearby vehicles to announce themselves, said vehicles may be identified and located in a convenient, quick and failsafe manner. That is, e.g. an operator, a mechanic, or a delivery man etc. associated with the service provider, may be made aware of where these nearby vehicles are located, without having to solely rely on e.g. geographic guidance and/or descriptions of the vehicles destined for delivered services. For that reason, a more efficient approach with regards to addressing and identifying vehicles adapted for receipt of a delivered service, is provided.

The technical features and corresponding advantages of the above mentioned method will be discussed in further detail in the following.

By introducing a method performed by a vehicle identification system for addressing and identifying vehicles adapted for receipt of a delivered service while being unattended, an approach is provided which enables for delivery of a service and/or a product to an unattended vehicle. The referred to "vehicles adapted for receipt of a delivered service while being unattended" is throughout this disclosure intended to at least refer to arbitrary vehicles which, in a known manner, are or may be pre-configured to give temporary access to the vehicle, or e.g. to a trunk thereof, to a service provider, to be able to receive the delivered service. The arbitrary vehicle may for instance refer to an engine-propelled vehicle, such as car, truck, lorry, van, bus, tractor, military vehicle, air plane etc., or alternatively a rail-bound vehicle, such as e.g. a train or tram. The vehicle being "unattended" refers at least to the vehicle being, for instance, parked and locked, without the driver, owner, passenger or any arbitrary person accountable for the vehicle, being present. It should be noted, that in a scenario when the e.g. person accountable for the vehicle happens to be present in the vehicle, although such a scenario is neither necessary nor intended, said delivered service may nonetheless be received according to the proposed concept. Furthermore, the referred to "delivered service" which the vehicles may be adapted to receive, may vary from one vehicle to another, and may for instance relate to delivery of a product, such as e.g. a parcel, goods, dry cleaned clothes, food etc., or delivery of a service, such as e.g. a vehicle service, vehicle reconditioning or the like. Accordingly, the referred to "service provider" is throughout this disclosure intended to refer to any arbitrary service entity and/or service person providing delivered services. That is, the "service provider" may at least refer to a service entity providing delivered services according to the foregoing, for instance a vehicle carrying deliveries such as a car, scooter, bicycle or van, or for instance a service vehicle carrying equipment necessary to service the vehicle destined therefore. The "service provider" may as a complement include an operator performing the delivered service, such as e.g. a delivery man, mechanic, or the like. The "vehicle identification system" may, for instance, be implemented on one or several servers, and may be adapted to communicate, e.g. wirelessly, with the service provider. Additionally, the vehicle identification system may be adapted to communicate with the vehicles adapted for receipt of delivered services. Such a communication may for instance take place via an intermediate system adapted to communicate with vehicles and to hold updated positions of the vehicles, for instance a management and/or assisting system such as e.g. Volvo On Call.

Since the vehicle identification system determines, by means of a determining unit, a position of one or more vehicles of a group of vehicles awaiting the delivered service, positioning of the vehicles may be taken into consideration. The referred to "group of vehicles" may comprise at least a single vehicle, and range up to any arbitrary number of vehicles, e.g. the vehicles parked in a certain parking lot. Furthermore, the referred to "position" is intended to refer to a respective position, for instance GPS based coordinates, of each respective vehicle of the group. Learning of the position may be accomplished through commonly known means, and furthermore be fetched at a current instant in time; additionally and/or alternatively, a stored position value may be fetched, e.g. from a database holding dynamic position values, which database for instance may be comprised in an intermediate system as described in the foregoing.

Since the vehicle identification system furthermore determines, by means of the determining unit, a position of a service provider adapted to carry out the delivered service, positioning of the service provider may be taken into consideration. The referred to "position of the service provider" may, for instance, refer to GPS based coordinates of the service provider, and may further relate to the position of the e.g. delivery or service vehicle, and/or an operator thereof intended to carry out the delivered service, who may carry a device enabling for positioning. Furthermore, learning of said position may be accomplished through commonly known means, and furthermore be fetched at a current instant in time. Additionally and/or alternatively, a stored position value of the service provider may be fetched, e.g. from a database holding dynamic position values, which database for instance may be comprised in an intermediate system as described above.

Since the vehicle identification system receives, by means of a receiving unit, an input from the service provider indicating an interest in nearby vehicles, out of the group of vehicles, which are in vicinity of the service provider, it is noted that the service provider would like to identify vehicles destined for a delivered service in a nearby area. The referred to "input" may, for instance, be represented by a signal or message received from the service provider, which signal or message comprises a request to identify vehicles considered to be nearby. The input may, for instance, be automatically generated and submitted by the service provider when approaching a vehicle destined for receipt of a delivered service, if the vehicle is determined to be in vicinity of the service provider.

Since the vehicle identification system determines, by means of the determining unit, at least a first nearby vehicle, out of the group of vehicles, to be in vicinity of the service provider, based on considering a determined position of the first nearby vehicle in view of the position of the service provider, vehicles considered to be nearby the service provider are identified. The referred to "at least a first nearby vehicle" may be represented by any one or several arbitrary vehicles out of the group of vehicles. Furthermore, the referred to "in vicinity of the service provider" is throughout this disclosure intended to at least refer to vehicles destined for receipt of a delivered service, which are judged to be nearby the service provider. The referred to "based on considering a determined position of the first nearby vehicle in view of the position of the service provider" refers to the position of the first nearby vehicle being compared to the position of the service provider, to thereby decide whether the first nearby vehicle is judged to be in the vicinity of the service provider. The first nearby vehicle may, for instance, be considered to "be in vicinity" of the service provider if the first nearby vehicle is at a relative close distance from the service provider, for instance at a distance at which a e.g. service provider operator is assumed to be within a visual and/or audible range. What is considered to "be in vicinity" may hence vary in accordance with geographical conditions of the positions of the vehicles and/or service provider, such as whether said positions are determined to be within an open area such as e.g. a parking lot, and/or within an area obstructed by e.g. buildings. "Based on" is throughout this disclosure intended to be interpreted to likewise include at least "utilizing", "considering" and "taking into account". It should further be noted that one scenario may be that no vehicles, out of the group of vehicles, are considered to be in vicinity of the service provider, if the vehicles are considered to be too far away from the service provider.

Since the vehicle identification system additionally requests, by means of a requesting unit, at least the first nearby vehicle to announce itself, the first nearby vehicle is addressed, and subsequently inquired, to take action to bring attention to its whereabouts. That is, vehicles adapted for receipt of delivered services, which vehicles are judged to be in vicinity of the service provider, are inquired to announce themselves, to thereby enable for e.g. a service provider operator such as a delivery man or a mechanic, to take notice of where said vehicles are situated, e.g. parked. Accordingly, said vehicles may be addressed, and subsequently identified by a service provider operator, in a convenient and robust manner. The requesting unit may, for instance, request the announcing to last an arbitrary period of time, to be repeated periodically, and/or comprise of a combination of elements which may bring attention to the first nearby vehicle. Furthermore, requesting the first nearby vehicle to announce itself may, for instance, be implemented by transmitting a request via an intermediate system, for instance the previously mentioned management and/or service system such as e.g. Volvo On Call, which in turn may "wake up" the vehicle and inquire the same to announce itself.

According to an embodiment, the requesting unit may request at least the first nearby vehicle to announce itself visually and/or audibly, for instance by means of blinking and/or honking. Thereby, by requesting the first nearby vehicle to announce itself visually and/or audibly, the first nearby vehicle is inquired to bring attention to itself in a manner which may be easily captured by the e.g. service provider operator, as he/or she is assumed to be in vicinity of said vehicle. The requesting unit may, for instance, request the first nearby vehicle to announce itself via a light device specifically adapted for the vehicle to visually announce itself; additionally and/or alternatively, via means already commonly provided on vehicles, such as via e.g. headlights. In a similar manner, the requesting unit may further, for instance, request the first vehicle to announce itself via a sound device specifically adapted for the vehicle to audibly announce itself; additionally and/or alternatively, via means already commonly provided on vehicles, such as via e.g. a car horn or vehicle alarm system. Visual and audible announcing may be combined in any arbitrary manner suitable for the implementation at hand.

According to another embodiment, the determining unit may further determine at least a second nearby vehicle, out of the group of vehicles, to be in vicinity of the service provider, based on considering a determined position of the second nearby vehicle in view of the position of the service provider. Furthermore, the requesting unit may further request at least the second nearby vehicle to announce itself. Thereby, at least two vehicles destined for delivered services are judged to be in vicinity of the service provider. Accordingly, by the requesting unit requesting as well the second nearby vehicle to announce itself, at least two vehicles announce themselves simultaneously, or essentially simultaneously. Thereby, a e.g. service provider operator assumed to be in the vicinity of the first nearby vehicle as well as the second, may notice the announcements, and hence judge to provide the respective delivered service in an order considered appropriate for the situation at hand. The referred to "at least a second nearby vehicle" may be represented by any one or several arbitrary vehicles out of the group of vehicles According to yet another embodiment, the determining unit may determine the at least first nearby vehicle, out of the group of vehicles, to be in vicinity of the service provider, based on: a distance between the position of the first nearby vehicle and the position of the service provider being within a predetermined range, and/or the position of the first nearby vehicle being within a predetermined region associated with the position of the service provider. Thereby, distances between positions of vehicles adapted for receipt of delivered services and the service provider may be compared to a predetermined threshold value, and if a distance value is lower than said threshold value, i.e. within said range, the corresponding vehicle is judged to be in vicinity of the service provider. In a similar manner, positions of vehicles adapted for receipt of delivered services may be compared to the position of the service provider, and if a vehicle position is within a predetermined region associated with the position of the service provider, the corresponding vehicle is judged to be in vicinity of the service provider. The referred to "range" may, for instance, range from a few meters up to several hundreds of meters, whereas the referred to "region" may refer to any arbitrary region geographically associated with the determined position of the service provider, such as e.g. a section or parking lot of arbitrary size and disposition. The range as well as the region may hence vary with the situation at hand. "Associated with" is throughout this disclosure intended to be interpreted to likewise include at least "close to", "nearby", "in the vicinity of" and "surrounding".

According to still another embodiment, the vehicle identification system may receive a position of one or more vehicles of the group of vehicles awaiting the delivered service indirectly or directly from the corresponding vehicle, and/or request at least the first nearby vehicle to announce itself by sending a request indirectly or directly to the first nearby vehicle. Thereby, the vehicle identification system may communicate either directly with the vehicles, or alternatively and/or additionally indirectly, for instance via an intermediate system as discussed in the foregoing. That is, in some scenarios it may be suitable to communicate directly with the vehicles, whereas in other scenarios, it may be preferred to communicate indirectly via e.g. a management and/or assistance system such as e.g. the previously mentioned Volvo On Call. In the latter case, already established systems may be utilized, and subsequently already established implementations of "waking up" and communicating with the vehicles.

According to one embodiment, the receiving unit may receive the input from the service provider from a user interface of a control unit associated with the service provider, which control unit is in communication with the vehicle identification system, and which control unit e.g. is comprised in the service provider and/or comprised in a mobile user equipment. Thereby, the service provider, for instance by means of the service provider operator, may provide the input e.g. when approaching an area assumed to hold vehicles adapted for receipt of delivered services. The referred to "mobile user equipment" may refer to, for instance, a mobile terminal or wireless terminal, a mobile phone, a computer such as e.g. a laptop, a Personal Digital Assistant (PDA) or tablet computer, sometimes referred to as a surf plate, with wireless capability, a Machine to Machine (M2M) device or any other radio network unit capable to communicate with the vehicle identification system, or for example, a portable, pocket-storable, hand-held, computer-comprised, or vehicle-mounted mobile device. The referred to "user interface" may for instance be represented by a touch display and/or physical e.g. push buttons and/or knobs. According to an example, the control unit, and subsequently the user interface, may be considered to be part of a system, which system in addition to the control unit comprises the vehicle identification system. The control unit may be adapted to be in constant communication with the vehicle identification system or it may be in temporary communication, e.g. when requests are made.

According to a second aspect of embodiments herein, the object is achieved by a vehicle identification system for addressing and identifying vehicles adapted for receipt of a delivered service while being unattended. The vehicle identification system comprises a determining unit adapted for determining a position of one or more vehicles of a group of vehicles awaiting the delivered service. The determining unit is further adapted for determining a position of a service provider adapted to carry out the delivered service. The vehicle identification system furthermore comprises a receiving unit adapted for receiving an input from the service provider, which input indicates an interest in nearby vehicles, out of the group of vehicles, which are in vicinity of the service provider. The determining unit is further adapted for determining at least a first nearby vehicle, out of the group of vehicles, to be in vicinity of the service provider, based on considering a determined position of the first nearby vehicle in view of the position of the service provider. Additionally, the vehicle identification system comprises a requesting unit adapted for requesting at least the first nearby vehicle to announce itself.

According to an embodiment, the requesting unit may be adapted to request at least the first nearby vehicle to announce itself visually and/or audibly, for instance by means of blinking and/or honking.

According to another embodiment, the determining unit may be further adapted to determine at least a second nearby vehicle, out of the group of vehicles, to be in vicinity of the service provider, based on considering a determined position of the second nearby vehicle in view of the position of the service provider. Additionally, the requesting unit may further be adapted to request at least the second nearby vehicle to announce itself.

According to yet another embodiment, the determining unit may be adapted to determine the at least first nearby vehicle, out of the group of vehicles, to be in vicinity of the service provider, based on: a distance between the position of the first nearby vehicle and the position of the service provider being within a predetermined range, and/or the position of the first nearby vehicle being within a predetermined region associated with the position of the service provider.

According to still another embodiment, the determining unit may be adapted to receive the position of the one or more vehicles of the group of vehicles awaiting the delivered service, directly or indirectly from the corresponding vehicle. Additionally and/or alternatively, the requesting unit may be adapted to send a request indirectly or directly to the first nearby vehicle.

According to one embodiment, the receiving unit may be adapted to receive the input from a user interface of a control unit associated with the service provider, adapted to be in communication with the vehicle identification system. The control unit may e.g. be comprised in the service provider and/or comprised in a mobile user equipment.

Similar advantages as those mentioned in the foregoing in relation to the first aspect correspondingly apply to the second aspect, why these advantages are not further discussed.

According to a third aspect of embodiments herein, the object is achieved by a method performed by an announcing system for enabling a vehicle identification system to address and identify vehicles adapted for receipt of a delivered service while being unattended. The announcing system provides, by means of a position provision unit comprised in the announcing system, a position of one or more vehicles of a group of vehicles awaiting the delivered service, to the vehicle identification system, which vehicle identification system is adapted to: determine a position of a service provider adapted to carry out the delivered service, receive an input from the service provider indicating an interest in nearby vehicles, out of the group of vehicles, which are in vicinity of the service provider, and determine at least a first nearby vehicle, out of the group of vehicles, to be in vicinity of the service provider, based on considering a determined position of the first nearby vehicle in view of the position of the service provider. The announcing system furthermore receives, by means of a request receiving unit comprised in the announcing system, from the vehicle identification system, a request for the at least first nearby vehicle to announce itself. Additionally, the announcing system initiates, by means of an initiating unit comprised in the announcing system, announcing of the at least first nearby vehicle. Once again, similar advantages as those mentioned in the foregoing in relation to the first aspect correspondingly apply to the third aspect, why these advantages are not further discussed.

According to a fourth aspect of embodiments herein, the object is achieved by an announcing system for enabling a vehicle identification system to address and identify vehicles adapted for receipt of a delivered service while being unattended. The announcing system comprises a position provision unit adapted for providing, to the vehicle identification system, a position of one or more vehicles of a group of vehicles awaiting the delivered service, which vehicle identification system is adapted to: determine a position of a service provider adapted to carry out the delivered service, receive an input from the service provider indicating an interest in nearby vehicles, out of the group of vehicles, which are in vicinity of the service provider, and determine at least a first nearby vehicle, out of the group of vehicles, to be in vicinity of the service provider, based on considering a determined position of the first nearby vehicle in view of the position of the service provider. The announcing system furthermore comprises a request receiving unit adapted for receiving, from the vehicle identification system, a request for the at least first nearby vehicle to announce itself. Additionally, the announcing system comprises an initiating unit adapted for initiating announcing of the at least first nearby vehicle. Once more, similar advantages as those mentioned in the foregoing in relation to the first aspect correspondingly apply to the fourth aspect, why these advantages are not further discussed.

According to a fifth aspect of embodiments herein, the object is achieved by a vehicle adapted for receipt of a delivered service while unattended, which vehicle comprises at least parts of the previously discussed position provision unit, the request receiving unit and/or the initiating unit of the announcing system mentioned in the foregoing. Yet again, similar advantages as those mentioned in the foregoing in relation to the first aspect correspondingly apply to the fifth aspect, why these advantages are not further discussed.

BRIEF DESCRIPTION OF THE DRAWINGS

The various aspects of the non-limiting embodiments of the invention, including particular features and advantages, will be readily understood from the following detailed description and the accompanying drawings, in which.

DETAILED DESCRIPTION

The non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to addressing and identifying vehicles adapted for receipt of a delivered service while being unattended, there will be disclosed that by considering positions of a service provider and vehicles awaiting a delivery of a product and/or a service, and further by sorting out which vehicles are considered to be in vicinity of the service provider and requesting these nearby vehicles to announce themselves, said vehicles may be identified and located in a convenient, quick and failsafe manner.

Figure 1:
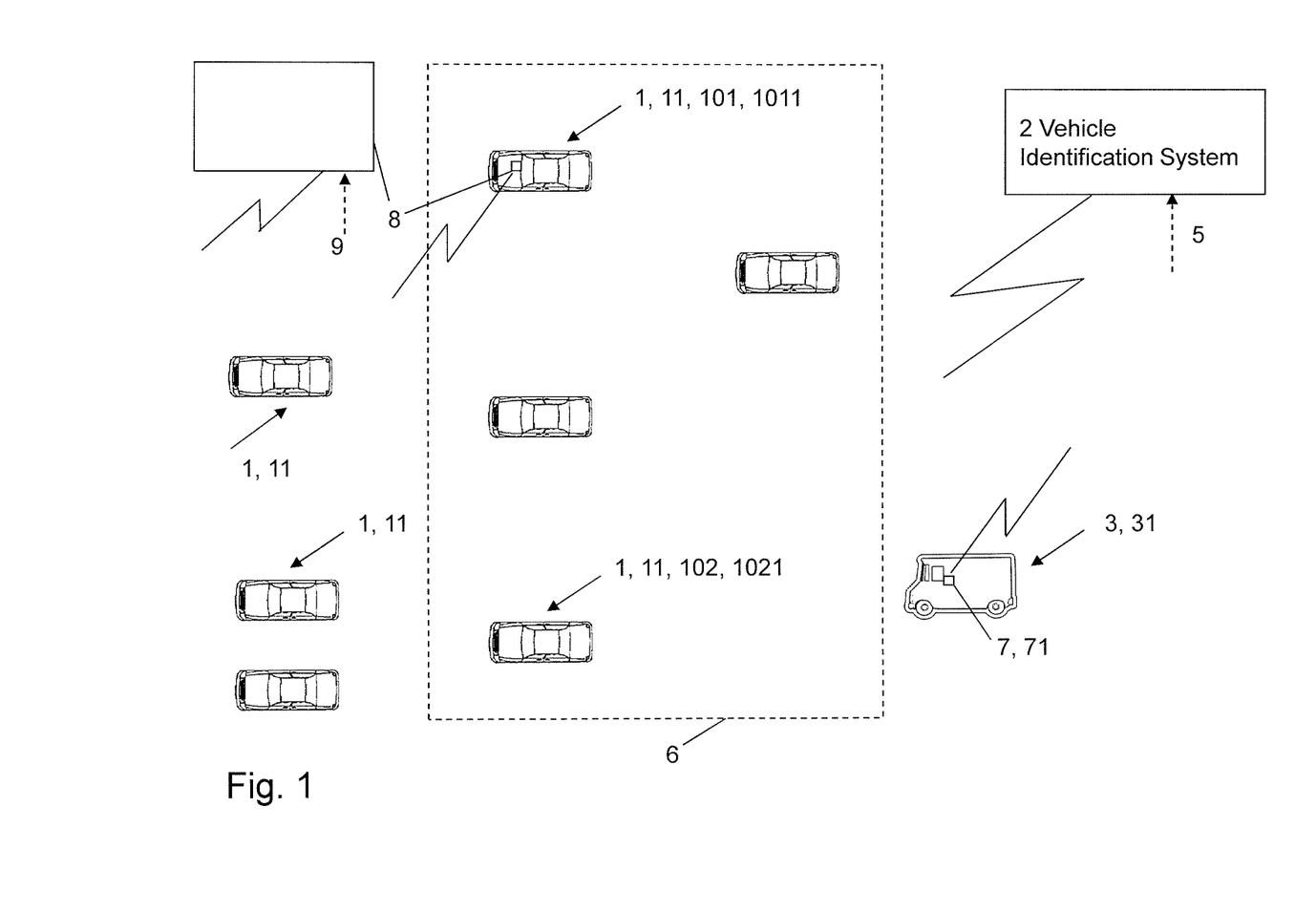
FIG. 1 illustrates a schematic overview of an exemplifying vehicle identification system and an exemplifying announcing system according to embodiments of the disclosure, along with an exemplifying service provider and vehicles.

Referring now to the figures and FIG. 1 in particular, there is depicted a schematic overview of an exemplifying vehicle identification system 2 and an exemplifying announcing system 8 according to embodiments of the disclosure, along with an exemplifying service provider 3 and vehicles. The vehicle identification system 2, which will be described in further detail later on, is configured for addressing and identifying vehicles adapted for receipt of a delivered service while being unattended. In a similar manner, the announcing system 8, which as well will be described in further detail later on, is configured for enabling the vehicle identification system to address and identify vehicles adapted for receipt of a delivered service while being unattended. The vehicle identification system 2, the announcing system 8 and the service provider 3 may be adapted to communicate with one another directly and/or to some extent via an intermediate system; for instance via a management and/or assistance system such as e.g. Volvo On Call.

The illustrated vehicles are in the shown embodiment cars, which are parked in an arbitrary parking lot, and subsequently considered to be unattended. Furthermore, vehicles, here cars, destined for receiving delivered services are considered to belong to a group of vehicles 1 awaiting the delivered service, which vehicles are situated at respective positions 11.

The service provider 3 is adapted to carry out the delivered service, and is in the shown embodiment an exemplifying delivery van situated at a service provider position 31. The service provider 3 may comprise a control unit 7 associated with the service provider 3, which control unit 7 comprises a user interface 71 and is adapted to be in communication with the vehicle identification system 2. Although the control unit 7 in the shown embodiment is comprised in the service provider 3, according to alternative embodiments, the control unit may be comprises in a mobile user equipment, for instance carried by a service provider operator. An input 5 to the vehicle identification system 2, which may be provided by the service provider 3, represents an indication of interest in nearby vehicles, out of the group of vehicles 1, which are in vicinity of the service provider 3.

Additionally, in the shown embodiment, there is depicted an exemplifying region 6 associated with the position 31 of the service provider. The region 6 is here a subsection of the parking lot with a rectangular shape, although according to alternative embodiments, the region 6 may be selected to be of any arbitrary size and/or shape suitable for the situation at hand.

Furthermore depicted in the shown embodiment, is a first nearby vehicle 101, at a determined first nearby vehicle position 1011, and a second nearby vehicle 102, at a determined second nearby vehicle position 1021. The position 1011 of the first nearby vehicle 101 and the position 1021 of the second nearby vehicle are both within the region 6. A request 9 to the announcing system 3, which may be provided by the vehicle identification system 2, represents a request for the first nearby vehicle 101 to announce itself.

Figure 2:
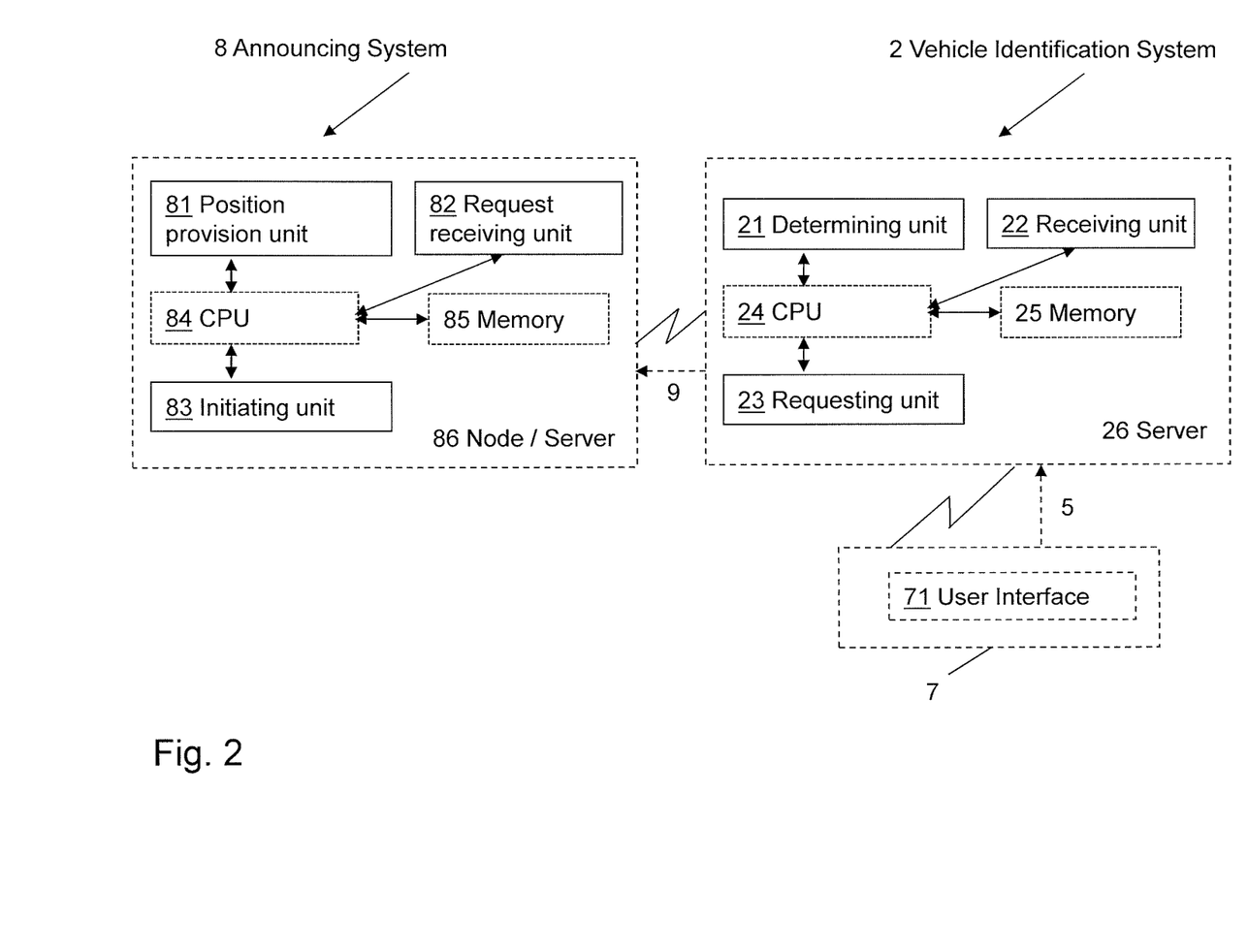
FIG. 2 is a schematic block diagram illustrating an exemplifying vehicle identification system and an exemplifying announcing system according to embodiments of the disclosure.

As further shown in FIG. 2, which depicts a schematic block diagram illustrating an exemplifying vehicle identification system 2 and an exemplifying announcing system 8 according to embodiments of the disclosure, the vehicle identification system 2 is, as previously mentioned, configured for addressing and identifying vehicles adapted for receipt of a delivered service while being unattended, whereas the announcing system 8, as also previously mentioned, is configured for enabling the vehicle identification system 2 to address and identify vehicles adapted for receipt of a delivered service while being unattended.

The vehicle identification system 2 comprises a determining unit 21, a receiving unit 22 and a requesting unit 23. Furthermore, the embodiments herein for addressing and identifying vehicles adapted for receipt of a delivered service while being unattended, may be implemented through one or more processors, such as a processor 24, here denoted CPU, together with computer program code for performing the functions and actions of the embodiments herein. Said program code may also be provided as a computer program product, for instance in the form of a data carrier carrying computer program code for performing the embodiments herein when being loaded into the vehicle identification system 2. One such carrier may be in the form of a CD ROM disc. It is however feasible with other data carriers such as a memory stick. The computer program code may furthermore be provided as pure program code on a server and downloaded to the vehicle identification system 2.

The vehicle identification system 2 may further comprise a memory 25 comprising one or more memory units. The memory 25 may be arranged to be used to store e.g. information, and further to store data, configurations, schedulings, and applications, and for instance temporary position data, to perform the methods herein when being executed in the vehicle identification system 2. Furthermore, the determining unit 21, the receiving unit 22, the requesting unit 23, the processor 24, and the memory 25 may for instance be implemented in one or several arbitrary servers 26, which may be located at any arbitrary location or locations suitable for the implementation at hand. Those skilled in the art will also appreciate that the determining unit 21, the receiving unit 22, the requesting unit 23 described above, and which will be described in more detail later on in this description, may refer to a combination of analog and digital circuits, and/or one or more processors configured with software and/or firmware, e.g. stored in a memory such as the memory 25, that when executed by the one or more processors such as the processor 24 perform as will be described in more detail later on. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

In a similar manner, the announcing system 8 comprises a position provision unit 81, a request receiving unit 82, and an initiating unit 83. Furthermore, the embodiments herein for enabling the vehicle identification system 2 to address and identify vehicles adapted for receipt of a delivered service while being unattended, may be implemented through one or more processors, such as a processor 84, here denoted CPU, together with computer program code for performing the functions and actions of the embodiments herein. Said program code may also be provided as a computer program product, for instance in the form of a data carrier carrying computer program code for performing the embodiments herein when being loaded into the announcing system 8. One such carrier may be in the form of a CD ROM disc. It is however feasible with other data carriers such as a memory stick. The computer program code may furthermore be provided as pure program code on a server and downloaded to the announcing system 8.

The announcing system 8 may further comprise a memory 85 comprising one or more memory units. The memory 85 may be arranged to be used to store e.g. information, and further to store data, configurations, schedulings, and applications, to perform the methods herein when being executed in the announcing system 8. Furthermore, the position provision unit 81, the request receiving unit 82, the initiating unit 83, the processor 84, and the memory 85 may for instance be implemented in one or several arbitrary servers and/or nodes 86. A node 86 may e.g. be an electronic control unit (ECU) or any suitable generic electronic device comprised in a vehicle, whereas a server(s) 86 may be located at any arbitrary location or locations suitable for the implementation at hand. The disposition of the functionality between the server(s) and node(s) may be arbitrary selected as considered suitable. According to an alternative example, the node may, rather than being represented by one or several integrated ECUs, be represented by a plug-in solution, for instance a dongle. In that manner, an aftermarket solution may be provided to any arbitrary vehicle suitable. According to one embodiment, a vehicle adapted for receipt of a delivered service while unattended, may comprise at least parts of the position provision unit 81, the request receiving unit 82, and/or the initiating unit 83 of the announcing system 8. Those skilled in the art will also appreciate that the position provision unit 81, the request receiving unit 82, the initiating unit 83 described above, and which will be described in more detail later on in this description, may refer to a combination of analog and digital circuits, and/or one or more processors configured with software and/or firmware, e.g. stored in a memory such as the memory 85, that when executed by the one or more processors such as the processor 84 perform as will be described in more detail later on. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

Figure 3:
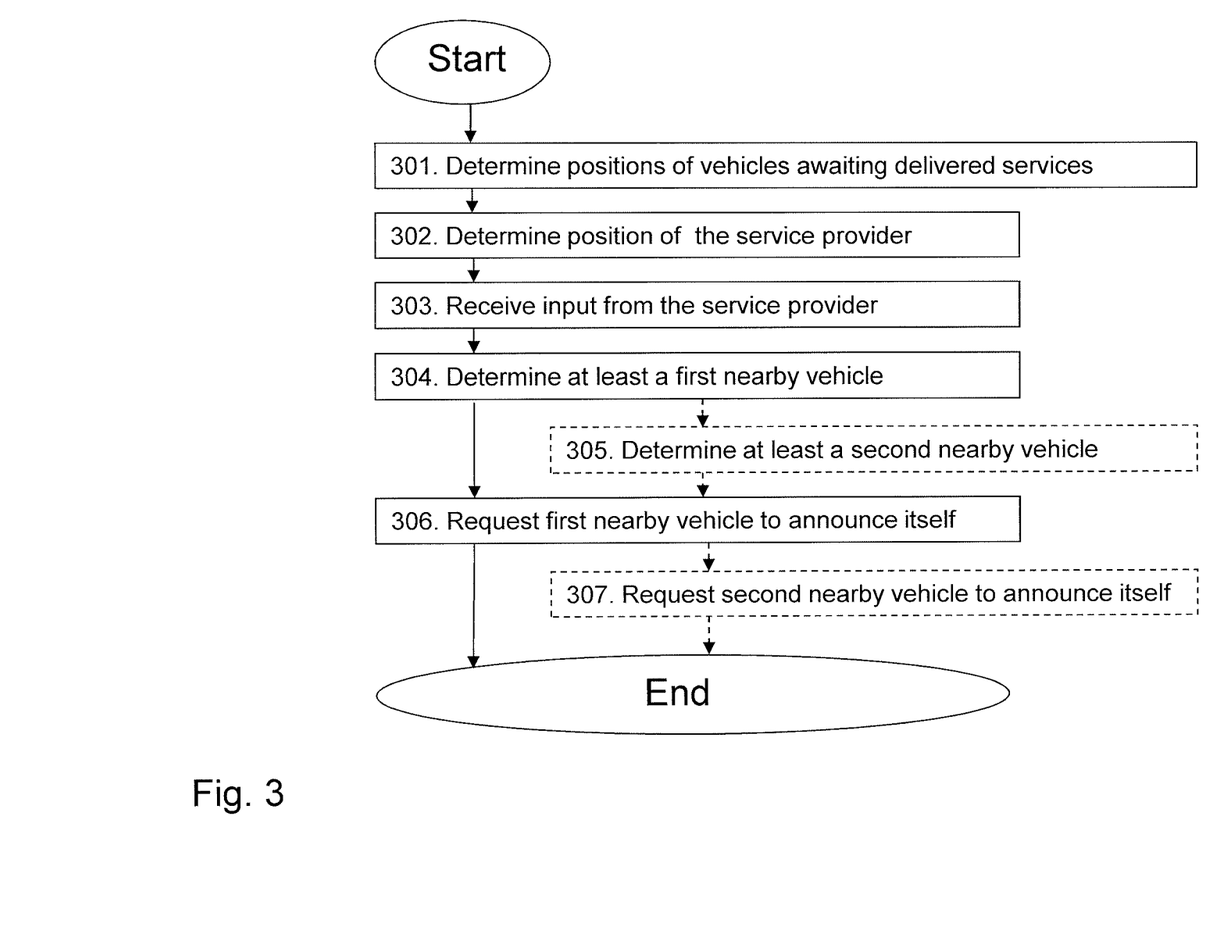
FIG. 3 is a flowchart depicting an exemplifying method performed by a vehicle identification system for addressing and identifying vehicles adapted for receipt of a delivered service while being unattended, according to embodiments of the disclosure.

FIG. 3 is a flowchart depicting an exemplifying method performed by a vehicle identification system 2 for addressing and identifying vehicles adapted for receipt of a delivered service while being unattended, according to embodiments of the disclosure. The exemplifying method, which may be continuously repeated, comprises the following actions discussed with support from FIGS. 1 and 2. The actions may be taken in any suitable order, and/or one or more actions may even be performed simultaneously where applicable.

Action 301

In Action 301, the vehicle identification system 2 determines, by means of the determining unit 21, the position 11 of one or more vehicles of the group of vehicles 1 awaiting the delivered service.

Furthermore, the Action 301 of determining a position 11 of one or more vehicles of a group of vehicles 1 awaiting the delivered service, may comprise receiving the position 11 indirectly or directly from the corresponding vehicle.

Action 302

In Action 302, the vehicle identification system 2 determines, by means of the determining unit 21, the position 31 of the service provider 3 adapted to carry out the delivered service.

Action 303

In Action 303, the vehicle identification system 2 receives, by means of the receiving unit 22, from the service provider 3, the input 5 indicating an interest in nearby vehicles, out of the group of vehicles 1, which are in vicinity of the service provider 3. Please note that Action 303 may be performed prior to, or simultaneously with, Action 302.

Optionally, the Action 303 of receiving the input 5 from the service provider 3 comprises receiving the input 5 from the user interface 71 of the control unit 7 associated with the service provider 3. The control unit 7 is in communication with the vehicle identification system 2, and may for instance be comprised in the service provider 3 and/or comprised in a mobile user equipment.

Action 304

In Action 304, the vehicle identification system 2 determines, by means of the determining unit 21, at least the first nearby vehicle 101, out of the group of vehicles 1, to be in vicinity of the service provider 3, based on considering the determined position 1011 of the first nearby vehicle 101 in view of the position 31 of the service provider 3.

Optionally, the Action 304 of determining at least the first nearby vehicle 101 to be in vicinity of the service provider 3, comprises determining the at least first nearby vehicle 101, out of the group of vehicles 1, to be in vicinity of the service provider 3, based on: a distance between the position 1011 of the first nearby vehicle 101 and the position 31 of the service provider 3 being within a predetermined range, and/or the position 1011 of the first nearby vehicle 101 being within the predetermined region 6 associated with the position 31 of the service provider 3.

Action 305

In optional Action 305, the vehicle identification system 2 may, by means of the determining unit 21, determine at least the second nearby vehicle 102, out of the group of vehicles 1, to be in vicinity of the service provider 3, based on considering the determined position 1021 of the second nearby vehicle 102 in view of the position 31 of the service provider 3.

Action 306

In Action 306, the vehicle identification system 2 requests, by means of the requesting unit 23, at least the first nearby vehicle 101 to announce itself.

Optionally, the Action 306 of requesting at least the first nearby vehicle 101 to announce itself comprises requesting at least the first nearby vehicle 101 to announce itself visually and/or audibly, for instance by means of blinking and/or honking.

Furthermore, the Action 306 of requesting at least the first nearby vehicle 101 to announce itself may comprise sending a request indirectly or directly to the first nearby vehicle 101.

Action 307

In optional Action 307, the vehicle identification system 2 may, by means of the requesting unit 23, request at least the second nearby vehicle 102 to announce itself.

Figure 4:
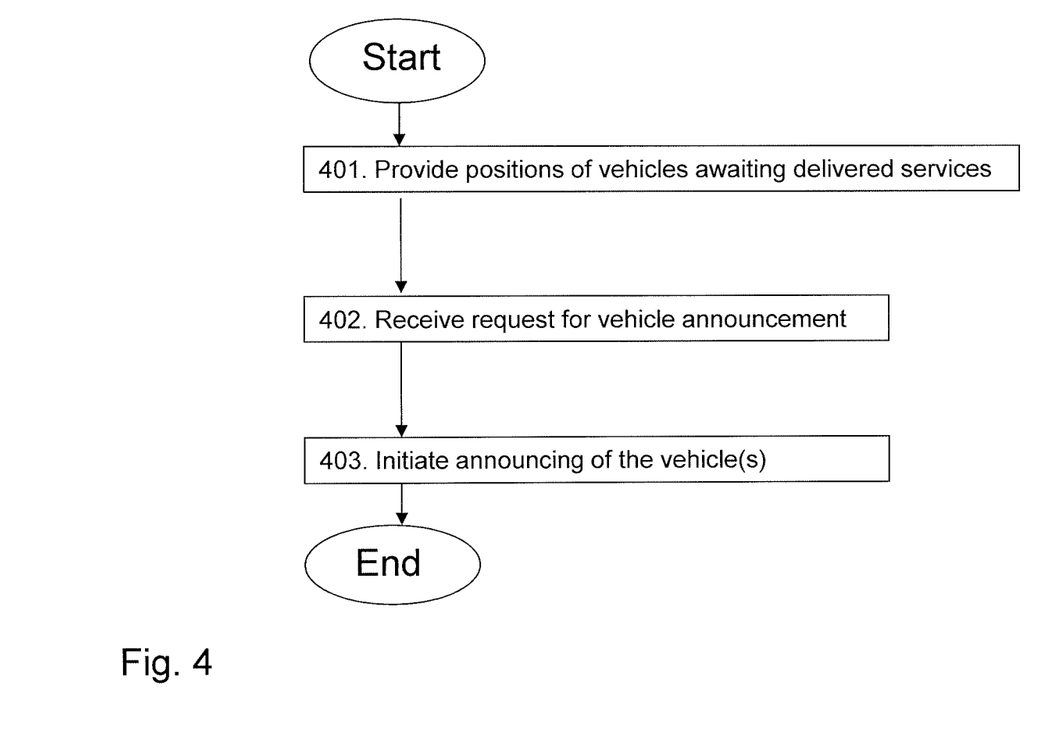
FIG. 4 illustrates a flowchart depicting an exemplifying method performed by an announcing system for enabling a vehicle identification system to address and identify vehicles adapted for receipt of a delivered service while being unattended, according to embodiments of the disclosure.

FIG. 4 illustrates a flowchart depicting an exemplifying method performed by the announcing system 8 for enabling the vehicle identification system 2 to address and identify vehicles adapted for receipt of a delivered service while being unattended, according to embodiments of the disclosure. The exemplifying method, which may be continuously repeated, comprises the following actions discussed with support from FIGS. 1 to 3. The actions may be taken in any suitable order, and/or one or more actions may even be performed simultaneously where applicable.

Action 401

In Action 401, the announcing system 8 provides, by means of the position provision unit 81, the position 11 of one or more vehicles of the group of vehicles 1 awaiting the delivered service, to the vehicle identification system 2. As previously discussed, the vehicle identification system 2 is adapted to: determine 302 the position 31 of the service provider 3 adapted to carry out the delivered service, receive 303 the input 5 from the service provider 3 indicating an interest in nearby vehicles, out of the group of vehicles 1, which are in vicinity of the service provider 3, and determine 304 at least the first nearby vehicle 101, out of the group of vehicles 1, to be in vicinity of the service provider 3, based on considering the determined position 1011 of the first nearby vehicle 101 in view of the position 31 of the service provider 3.

Action 402

In Action 402, the announcing system 8 receives, by means of the request receiving unit 82, from the vehicle identification system 2, the request 9 for the at least first nearby vehicle 101 to announce itself.

Action 403

In Action 403, the announcing system 8 initiates, by means of the initiating unit 83, announcing of the at least first nearby vehicle 101.

Consequently, according to the addressing and identifying of nearby vehicles 101, 102 adapted for receipt of delivered services described in the foregoing, a e.g. operator, mechanic, delivery man etc. associated with the service provider 3 may be made aware of where these nearby vehicles 101, 102 are located, in a convenient, quick and failsafe manner, without having to solely rely on e.g. geographic guidance and/or descriptions of the vehicles 101, 102.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

The invention claimed is:

1. A method performed by a vehicle identification system for addressing and identifying vehicles adapted for receipt of a delivered service while being unattended, said vehicle identification system being adapted to communicate indirectly or directly with said vehicles and with a service provide adapted to carry out said delivered service, said method comprising:
   determining, by means of a determining unit comprised in said vehicle identification system, a position of one or more vehicles of a group of vehicles awaiting said delivered service, which position is received indirectly or directly from the corresponding vehicle;
   determining, by means of said determining unit, a position of said service provider adapted to carry out said delivered service, which position is received indirectly or directly from said service provider;
   receiving, by means of a receiving unit comprised in said vehicle identification system, an input represented by a signal or message from said service provider indicating an interest in nearby vehicles, out of said group of vehicles, which are in vicinity of said service provider;
   determining, by means of said determining unit, at least a first nearby vehicle, out of said group of vehicles, to be in vicinity of said service provider, based on comparing a determined position of said first nearby vehicle to said position of the service provider; and
   requesting, by means of a requesting unit comprised in said vehicle identification system, at least said first nearby vehicle to announce itself visually and/or audibly, by sending a request indirectly or directly to said first nearby vehicle; wherein said determining the position of one or more vehicles of the group of vehicles awaiting said delivered service, comprises receiving said position indirectly or directly from a corresponding vehicle; and/or wherein said requesting at least the first nearby vehicle to announce itself comprises sending a request indirectly or directly to said first nearby vehicle.

2. The method according to claim 1, said first nearby vehicle announces itself visually and/or audibly by means of blinking and/or honking.

3. The method according to claim 1, wherein said determining at least the first nearby vehicle further comprises:
   determining at least a second nearby vehicle, out of said group of vehicles, to be in vicinity of said service provider, based on considering a determined position of said second nearby vehicle in view of said position of the service provider; and
   wherein said requesting at least the first nearby vehicle to announce itself further comprises:
   requesting at least said second nearby vehicle to announce itself.

4. The method according to claim 1, wherein said determining at least the first nearby vehicle comprises:
   determining the at least first nearby vehicle, out of said group of vehicles, to be in vicinity of said service provider, based on:
   a distance between said position of the first nearby vehicle and said position of the service provider being within a predetermined range, and/or said position of the first nearby vehicle being within a predetermined region associated with said position of the service provider.

5. The method according to claim 1, wherein said receiving the input from the service provider comprises:
   receiving said input from a user interface of a control unit associated with said service provider, which control unit is in communication with said vehicle identification system, said control unit e.g. being comprised in said service provider and/or comprised in a mobile user equipment.

6. A vehicle identification system for addressing and identifying vehicles adapted for receipt of a delivered service while being unattended, said vehicle identification system being adapted to communicate indirectly or directly with said vehicles and with a service provider adapted to carry out said delivered service, said vehicle identification system comprising:
   a determining unit adapted for determining a position of one or more vehicles of a group of vehicles awaiting said delivered service, which position is received indirectly or directly from the corresponding vehicle, said determining unit further being adapted for determining a position of said service provider adapted to carry out said delivered service, which position is received indirectly or directly from said service provider;

a receiving unit adapted for receiving an input represented by a signal or message from said service provider, said input indicating an interest in nearby vehicles, out of said group of vehicles, which are in vicinity of said service provider;

said determining unit further being adapted for determining at least a first nearby vehicle, out of said group of vehicles, to be in vicinity of said service provider, based on comparing a determined position of said first nearby vehicle to said position of the service provider; and a requesting unit adapted for requesting at least said first nearby vehicle to announce itself visually and/or audibly by sending a request indirectly or directly to said first nearby vehicle, wherein said determining unit is adapted to receive said position of the one or more vehicles of the group of vehicles awaiting said delivered service, directly or indirectly from the corresponding vehicle; and/or wherein said requesting unit is adapted to send a request indirectly or directly to said first nearby vehicle.

7. The vehicle identification system according to claim 6, wherein said requesting unit is adapted to request at least the first nearby vehicle to announce itself visually and/or audibly by means of blinking and/or honking.

8. The vehicle identification system according to claim 6, wherein said determining unit further is adapted to determine at least a second nearby vehicle, out of said group of vehicles, to be in vicinity of said service provider, based on considering a determined position of said second nearby vehicle in view of said position of the service provider; and wherein said requesting unit further is adapted to request at least said second nearby vehicle to announce itself.

9. The vehicle identification system according to claim 6, wherein
said determining unit is adapted to determine the at least first nearby vehicle, out of said group of vehicles, to be in vicinity of said service provider, based on:
a distance between said position of the first nearby vehicle and said position of the service provider being within a predetermined range, and/or said position of the first nearby vehicle being within a predetermined region associated with said position of the service provider.

10. The vehicle identification system according to claim 6, wherein said receiving unit is adapted to receive said input from a user interface of a control unit associated with said service provider, adapted to be in communication with said vehicle identification system, said control unit e.g. being comprised in said service provider and/or comprised in a mobile user equipment.

11. A method performed by an announcing system for enabling a vehicle identification system- to address and identify vehicles adapted for receipt of a delivered service while being unattended, said announcing system being adapted to communicate directly or indirectly with said vehicle identification system, said method comprising:

providing, by means of a position provision unit comprised in said announcing system, a position of one or more vehicles of a group of vehicles awaiting said delivered service, to said vehicle identification system, which vehicle identification system is adapted to communicate indirectly or directly with said vehicles and with a service provider adapted to carry out said delivered service, said vehicle identification system being adapted to:

determine a position of said service provider adapted to carry out said delivered service, which position is received indirectly or directly from said service provider, receive an input represented by a signal or message from said service provider indicating an interest in nearby vehicles, out of said group of vehicles, which are in vicinity of said service provider, and determine at least a first nearby vehicle, out of said group of vehicles, to be in vicinity of said service provider, based on comparing a determined position of said first nearby vehicle to said position of the service provider;

receiving, by means of a request receiving unit comprised in said announcing system, from said vehicle identification system, a request for said at least first nearby vehicle to announce itself visually and/or audibly; and initiating, by means of an initiating unit comprised in said announcing system, announcing of said at least first nearby vehicle, wherein said providing the position of one or more vehicles of the group of vehicles awaiting said delivered service, comprises providing said position indirectly or directly from a corresponding vehicle; and/or wherein said receiving a request for said at least the first nearby vehicle to announce itself comprises receiving a request indirectly or directly from said first nearby vehicle.

12. An announcing system for enabling a vehicle identification system to address and identify vehicles adapted for receipt of a delivered service while being unattended, said announcing system being adapted to communicate directly or indirectly with said vehicle identification system, said announcing system comprising: a position provision unit adapted for providing, to said vehicle identification system, a position of one or more vehicles of a group of vehicles awaiting said delivered service, which vehicle identification system is adapted to communicate indirectly or directly with said vehicles and with a service provider adapted to carry out said delivered service, said vehicle identification system being adapted to:

determine a position of said service provider adapted to carry out said delivered service, which position is received indirectly or directly from said service provider, receive an input represented by a signal or message from said service provider indicating an interest in nearby vehicles, out of said group of vehicles, which are in vicinity of said service provider, and determine at least a first nearby vehicle, out of said group of vehicles, to be in vicinity of said service provider, based on comparing a determined position of said first nearby vehicle to said position of the service provider;

a request receiving unit adapted for receiving, from said vehicle identification system, a request for said at least first nearby vehicle to announce itself visually and/or audibly; and an initiating unit adapted for initiating announcing of said at least first nearby vehicle, wherein said position provision unit is adapted to provide said position of the one or more vehicles of the group of vehicles awaiting said delivered service, directly or indirectly from a corresponding vehicle and/or wherein said request receiving unit is adapted to receive the request indirectly or directly from said first nearby vehicle.

13. A vehicle adapted for receipt of a delivered service while unattended, said vehicle comprising at least parts of said position provision unit, said request receiving unit and/or said initiating unit of the announcing system according to claim 12.

\* \* \* \* \*